United States Patent

Kwiatkowski et al.

[11] Patent Number: 5,839,417
[45] Date of Patent: Nov. 24, 1998

[54] CAST CYLINDERHEAD OF A MULTI-CYLINDER INTERNAL COMBUSTION ENGINE

[75] Inventors: Janusz Kwiatkowski; Eduard Zaiss, both of Stuttgart, Germany

[73] Assignee: Daimler-Benz AG, Stuttgart, Germany

[21] Appl. No.: 917,520

[22] Filed: Aug. 26, 1997

[30] Foreign Application Priority Data

Sep. 2, 1996 [DE] Germany .................. 196 35 535.4

[51] Int. Cl.⁶ .................................................. F02M 25/06
[52] U.S. Cl. ........................................ 123/568; 123/585
[58] Field of Search ................................. 123/568, 570, 123/585, 568.11, 568.13, 568.17

[56] References Cited

U.S. PATENT DOCUMENTS

| | | | |
|---|---|---|---|
| 3,937,194 | 2/1976 | Tamaki et al. | 123/568 |
| 4,643,157 | 2/1987 | Nishikawa et al. | 123/570 |
| 5,690,081 | 11/1997 | Kwiatkowski | 123/570 |

FOREIGN PATENT DOCUMENTS

| | | |
|---|---|---|
| 2 202 534 | 5/1974 | France . |
| 2 549 528 | 1/1985 | France . |
| 31 27 082 | 1/1983 | Germany . |
| 32 24 945 | 2/1984 | Germany . |
| 34 36 426 | 2/1988 | Germany . |
| 89 14 153.9 | 3/1990 | Germany . |
| 43 44 356 | 7/1994 | Germany . |

*Primary Examiner*—Marguerite McMahon
*Attorney, Agent, or Firm*—Klaus J. Bach

[57] ABSTRACT

In a cast cylinderhead of a multi-cylinder internal combustion engine wherein gas flow channels (exhaust gas and intake air flow channels) and at least one longitudinal gas flow passage with branch passages extending between the longitudinal gas flow passages and particular gas flow channels are formed in the cylinderhead, the gas flow channels, any longitudinal gas flow passage and all the branch passages are formed by a single-piece casting core structure.

3 Claims, 2 Drawing Sheets

CAST CYLINDERHEAD OF A MULTI-CYLINDER INTERNAL COMBUSTION ENGINE

BACKGROUND OF THE INVENTION

The invention resides in a cast cylinderhead of a multi-cylinder internal combustion engine with gas intake and exhaust channels and a longitudinally extending gas passage with communication passages extending therefrom and leading to various air intake or exhaust channels.

It is known to provide in a cylinderhead, a passage system for the admission of secondary air. The secondary air supply serves to treat the exhaust gas of internal combustion engines by a supplemental thermal combustion. By the introduction of air oxygen (secondary air), unburnt HC- and CO components still present in the exhaust gas can be burnt when subjected for a certain period to high temperatures. The supplemental thermal treatment of the exhaust gas by injection of secondary air is particularly important during the warm-up period of an internal combustion engine with a catalytic converter because it substantially reduces the heating period required for the catalytic converter to reach operating temperature. Preferably, the secondary air is admitted in the cylinderhead directly into the exhaust channels immediately adjacent the exhaust valves.

DE 31 27 082 A1, for example, discloses such a cylinderhead of a multi-cylinder internal combustion engine, which includes a corresponding passage system for the introduction of secondary air. The cylinderhead includes a longitudinal gas passage from which several spaced communication passages extend which all lead to respective exhaust channels. The passages are drilled into the cylinderhead or are formed by tubes cast into the cylinderhead which makes the manufacture of the cylinderhead relatively expensive.

For further general background information, reference is made to DE 43 44 356 A1.

It is the object of the present invention to provide a cylinderhead with gas flow channels and passages in such a way that a simple and inexpensive manufacture of the cylinderhead is facilitated.

SUMMARY OF THE INVENTION

In a cast cylinderhead of a multi-cylinder internal combustion engine having gas flow channels (exhaust gas and intake air flow channels) and at least one longitudinal gas flow passage with branch passages extending between the longitudinal gas flow passages and particular gas flow channels are formed in the cylinderhead, the gas flow channels, any longitudinal gas flow passage and all the branch passages are formed by a single piece casting core structure.

An important advantage of the invention resides in the simplified manufacture of the cylinderhead and the passage system for the introduction of air including a longitudinal passage with connecting branch passages. A common casting core is used for forming at the same time the passage system and the gas flow channels of the cylinderhead so that for example drilling of the gas flow passages as well as the insertion of distinct core pieces is eliminated. The invention also provides for a more accurate positioning of the gas flow channels with respect to one another. Furthermore, the air supply passage system can be designed in a less restricted fashion as their pattern can be selected with fewer restrictions as they are not drilled and therefore do not need to be straight. As a result, the cooling water space can remain essentially undisturbed.

Another advantage resides in how the passage system can be utilized. The passage system can be used for the introduction of secondary air into the exhaust gas channels as well as for the recirculation of exhaust gases. For the introduction of secondary air, the longitudinal passage is used as a secondary air supply passage from which the connecting passages extend which lead to the exhaust gas channels. For exhaust gas recirculation, the longitudinal passage is used as an exhaust gas recirculation passage from which connecting passages extend to the various intake channels.

Further embodiments of the invention and advantages thereof will become apparent from the description thereof on the basis of the accompanying drawings:

DESCRIPTION OF A PREFERRED EMBODIMENT

Figure 1:
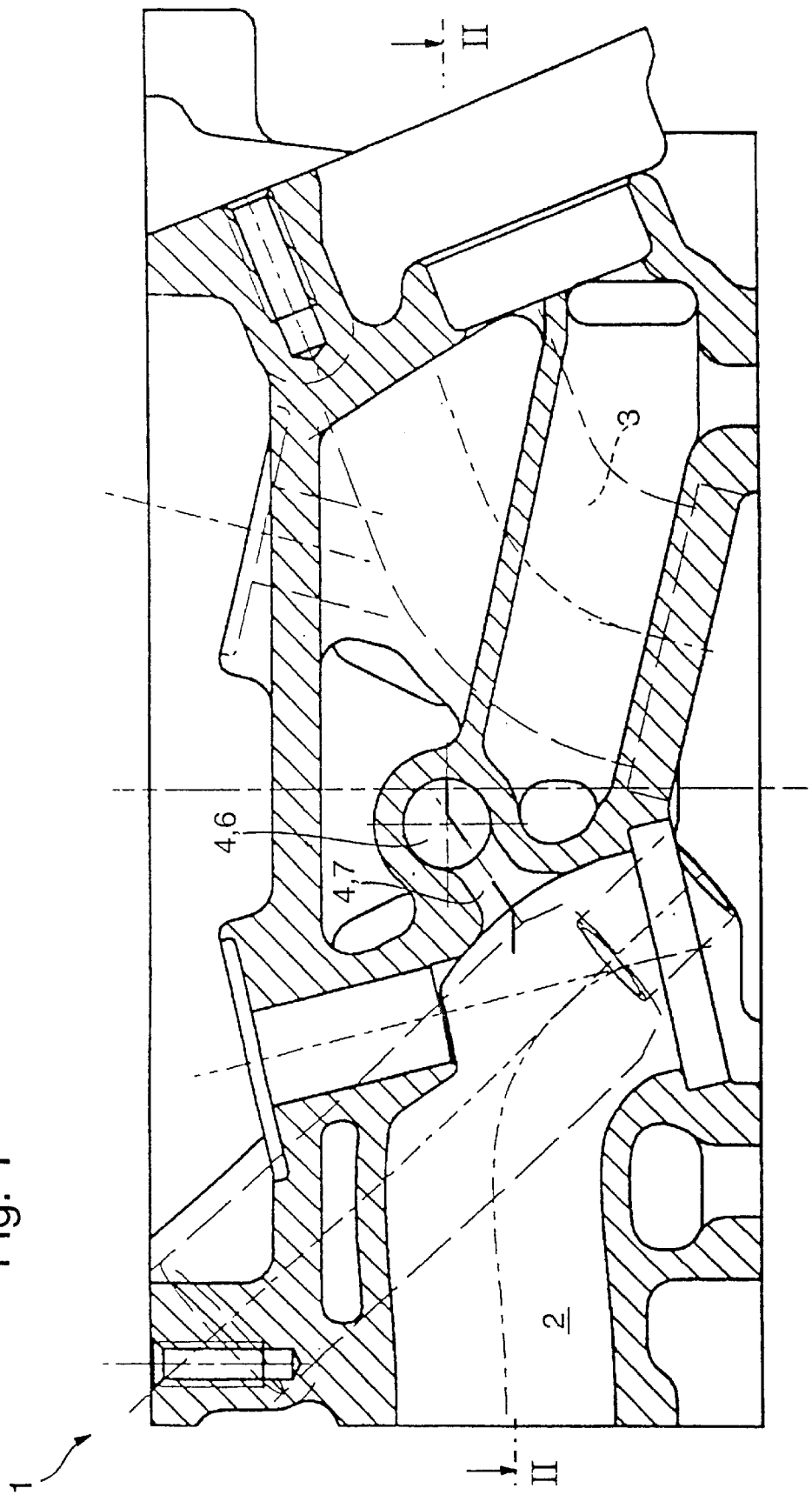
FIG. 1 is a cross-sectional view of a cylinderhead according to the invention with gas flow channels which are in communication with a longitudinal gas flow passage.
Figure 2:
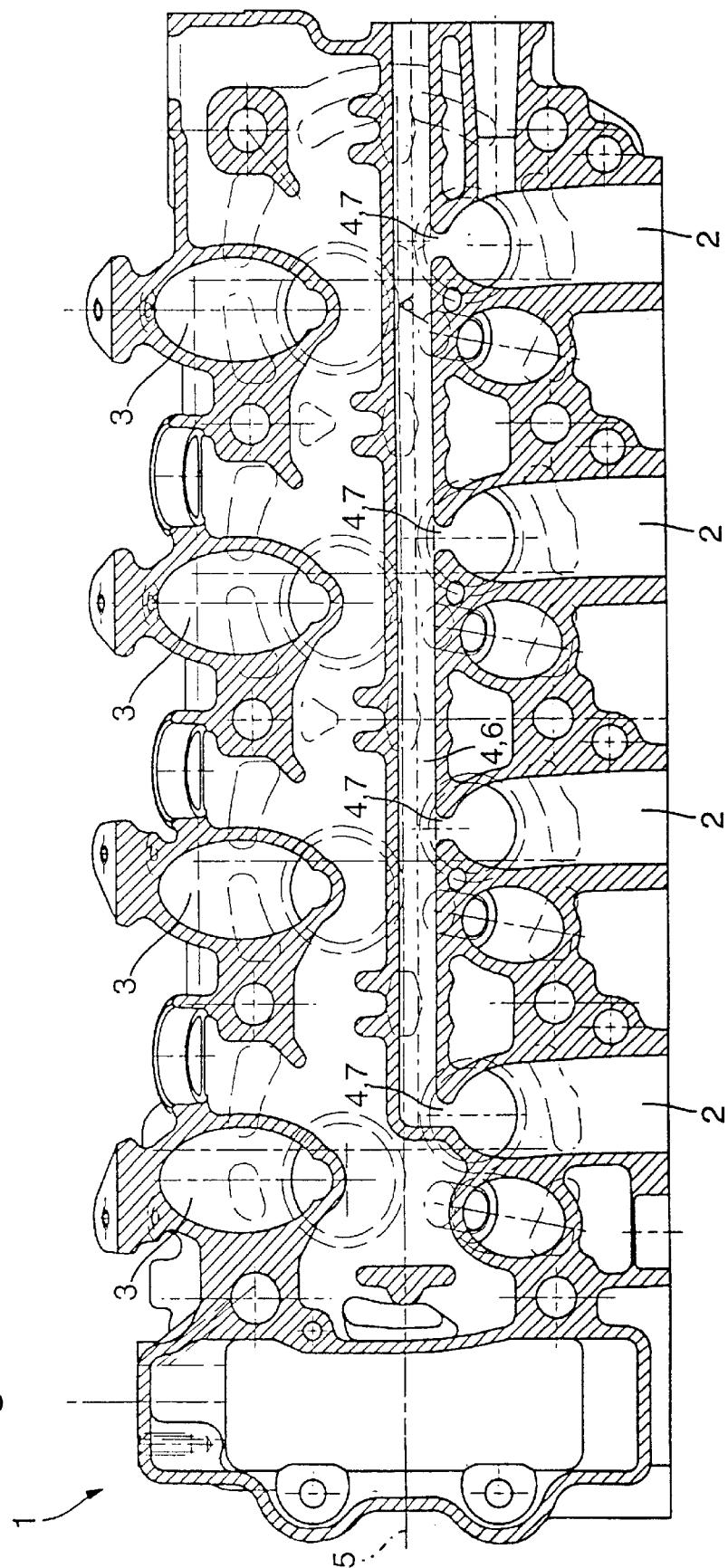
FIG. 2 is a cross-sectional view of the cylinderhead taken along line II—II of FIG. 1.

FIGS. 1 and 2 show a cast cylinderhead 1 for a multi-cylinder internal combustion engine which is not shown. The cylinderhead 1 includes gas flow channels 2, 3 and at least one passage system 4 for supplying air to the gas flow channels 2,3.

In the embodiment as shown, the passage system 4 serves to introduce secondary air wherein the longitudinal passage 6 forms a secondary air supply passage from which communication passages 7 extend to the respective exhaust gas flow channels 2.

In a corresponding manner, a passage system may be provided which is in communication with the air intake flow channels for supplying exhaust gas to the engine intake air. In order to eliminate the need to show this system separately in a drawing, in this respect, it can be assumed that the channel 2 is an intake air flow channel and the communication passage 7 extends between the intake air channel and the longitudinal passage 6 which then would be an exhaust gas supply passage.

If a cylinderhead includes both types of passage systems, that is, an air supply passage system and an exhaust gas supply passage system, each having a longitudinal flow passage, those longitudinal flow passages may be in communication by way of an additional flow passage.

In any case, the gas flow channels 2 and 3, the gas flow passages 6 and the communication passages 7 are all formed by casting cores portions which are, according to the invention, formed by a single casting core structure.

If both channel systems are present in a cylinderhead, the exhaust gas recirculation passages, the secondary air supply passages, the communication passages extending between the respective longitudinal exhaust gas recirculation and secondary air supply passages, all the gas flow channels and the additional flow passage by which the longitudinal exhaust gas recirculation and the secondary air supply passages are placed in communication and are formed by a single-piece casting core.

What is claimed is:

1. A cast cylinderhead of a multi-cylinder internal combustion engine, said cylinderhead including gas flow channels (exhaust gas and intake air flow channels) and at least one longitudinal gas flow passage with branch passages extending between said longitudinal gas flow passages and said gas flow channels, said gas flow channels, said at least one longitudinal gas flow passage and said branch passages all being formed by a single-piece core structure.

2. A cylinderhead according to claim 1, wherein said longitudinal gas flow passage is a secondary-air supply passage from which branch passages extend to the respective exhaust gas flow channels.

3. A cylinderhead according to claim 1, wherein said longitudinal gas flow passage is an exhaust gas recirculation passage from which branch passages extend to respective intake air flow channels.

\* \* \* \* \*